US009935486B2

(12) United States Patent
Huang et al.

(10) Patent No.: US 9,935,486 B2
(45) Date of Patent: Apr. 3, 2018

(54) WIRELESS CHARGING DEVICE

(71) Applicant: Wistron Corporation, New Taipei (TW)

(72) Inventors: Chia-Feng Huang, New Taipei (TW); Yung-Ching Chu, New Taipei (TW)

(73) Assignee: Wistron Corporation, New Taipei (TW)

( * ) Notice: Subject to any disclaimer, the term of this patent is extended or adjusted under 35 U.S.C. 154(b) by 238 days.

(21) Appl. No.: 14/872,169

(22) Filed: Oct. 1, 2015

(65) Prior Publication Data

US 2017/0012457 A1    Jan. 12, 2017

(30) Foreign Application Priority Data

Jul. 6, 2015   (TW) .............................. 104121916 A

(51) Int. Cl.
*H02J 7/00*     (2006.01)
*H01F 27/42*    (2006.01)
*H01F 37/00*    (2006.01)
*H01F 38/00*    (2006.01)
*H02J 7/02*     (2016.01)
*H02J 7/04*     (2006.01)

(52) U.S. Cl.
CPC ............ *H02J 7/025* (2013.01); *H02J 7/0044* (2013.01); *H02J 7/04* (2013.01)

(58) Field of Classification Search
CPC .......... H02J 7/025; H02J 7/0042; H02J 17/00; H02J 50/10; H02J 50/12; H02J 50/90; H02J 50/40; H02J 50/50; H02J 50/60; H02J 50/70; H02J 50/80

USPC ................... 320/107, 108, 114, 115; 307/104
See application file for complete search history.

(56) References Cited

U.S. PATENT DOCUMENTS

| | | | | |
|---|---|---|---|---|
| 8,248,028 | B2 * | 8/2012 | Toya ..................... | H02J 7/0027 320/107 |
| 9,627,918 | B2 * | 4/2017 | Chen ..................... | H02J 7/025 |
| 2007/0259554 | A1 * | 11/2007 | Lindblad ................ | F16M 11/10 439/354 |
| 2010/0259214 | A1 * | 10/2010 | Sip ....................... | H02J 7/0044 320/108 |
| 2011/0018499 | A1 * | 1/2011 | Fujiwara ............... | H01M 10/46 320/108 |
| 2011/0062916 | A1 * | 3/2011 | Farahani ............... | H01Q 1/248 320/108 |

(Continued)

*Primary Examiner* — Drew A Dunn
*Assistant Examiner* — Michael DiBenedetto
(74) *Attorney, Agent, or Firm* — JCIPRNET

(57) ABSTRACT

A wireless charging device capable of charging an electronic device is provided. The wireless charging device includes a supporting component, a stage and at least one electrical transmitter. The stage is used to carry the electronic device and is swingingly disposed on the platform through the supporting component. The electrical transmitter is movably disposed in the stage. When the electronic device is placed on an end of the stage which is relatively away from the supporting component, the stage swings in relative to the platform by using the supporting component as a fulcrum, and the stage is inclined to the platform. As a result, the electrical transmitter moves toward the electronic device due to gravitational pull, and thereby aligns with an electrical receiver in the electronic device so as to wirelessly charge the electronic device.

14 Claims, 4 Drawing Sheets

(56) References Cited

U.S. PATENT DOCUMENTS

| | | | | |
|---|---|---|---|---|
| 2011/0156638 A1* | 6/2011 | Thorsell | ............... | B60N 3/002 |
| | | | | 320/108 |
| 2012/0326659 A1* | 12/2012 | Shukuya | ............... | H02J 7/0044 |
| | | | | 320/108 |
| 2013/0234662 A1* | 9/2013 | Nakayama | ............ | H02J 7/0042 |
| | | | | 320/108 |
| 2013/0285606 A1* | 10/2013 | Ben-Shalom | ........... | H01F 38/14 |
| | | | | 320/108 |
| 2014/0091757 A1* | 4/2014 | Proebstle | .............. | B60L 11/182 |
| | | | | 320/108 |
| 2015/0204928 A1* | 7/2015 | Hoover | ................ | H02J 7/0042 |
| | | | | 320/108 |
| 2015/0255992 A1* | 9/2015 | Abe | ....................... | H01F 38/14 |
| | | | | 307/104 |
| 2016/0094070 A1* | 3/2016 | Mazzone | ............. | H02J 7/0044 |
| | | | | 320/115 |
| 2016/0094075 A1* | 3/2016 | Tseng | .................... | H02J 50/10 |
| | | | | 320/108 |

\* cited by examiner

WIRELESS CHARGING DEVICE

CROSS-REFERENCE TO RELATED APPLICATION

This application claims the priority benefit of Taiwan application serial no. 104121916, filed on Jul. 6, 2015. The entirety of the above-mentioned patent application is hereby incorporated by reference herein and made a part of this specification.

BACKGROUND OF THE INVENTION

1. Field of the Invention

The invention generally relates to a charging device, and more particularly, to a wireless charging device.

2. Description of Related Art

In a wireless charging system, power can be transmitted between a wireless charger and an electronic device to be charged by means selecting among inductive coupling, radio wave, electromagnetic induction, and magnetic resonance. That is, no wire is required to be connected between the wireless charger and the electronic device to be charged. Therefore, no conductive conduct is exposed by both the wireless charger and the electronic device to be charged, thereby enabling the product to have more design freedom and higher completeness. Generally, a user can charge the electronic device to be charged with the wireless charger by merely aligning and placing the electronic device to be charged close to the wireless charger. In other words, an alignment the electronic device to be charged and the wireless charger, such as whether the electronic device to be charged is aligned with the wireless charger or not, will inevitably affect the charging efficiency.

SUMMARY OF THE INVENTION

The invention is directed to a wireless charging device, which enables an electrical transmitter and an electrical receiver to automatically align with each other via gravity, so as to provide favorable wireless charging efficiency.

The invention provides a wireless charging device capable of charging at least one electronic device. The wireless charging device includes a supporting component, a stage and at least one electrical transmitter. The stage is configured to carry the electronic device, and is swingingly disposed on a platform through the supporting component. The electrical transmitter is movably disposed in the stage. When the electronic device swings in placed on an end of the stage which is relatively away from the supporting component, the stage swings in relative to the platform by using the supporting component as a fulcrum and is inclined to the platform, so the electrical transmitter moves toward the electronic device due to gravitational pull, and thereby aligns with an electrical receiver in the electronic device so as to wirelessly charge the electronic device.

In view of the above, the electrical transmitter in the wireless charging device of the invention may automatically align with the electronic device to be charged through the gravitational pull, and after the electrical transmitter is aligned with the electrical receiver in the electronic device to be charged via the gravity, the electrical transmitter and the electrical receiver can perform the wireless charging by means of inductive coupling, and thus an operational convenience of user and a wireless charging efficiency can be improved. On the other hand, the structural design of the wireless charging device can be simplified with the use of gravitational pull, and the embodiments of the invention also do not require using other electronic equipment for detecting the position of the electronic device to be charged, and thus the costs are lowered.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
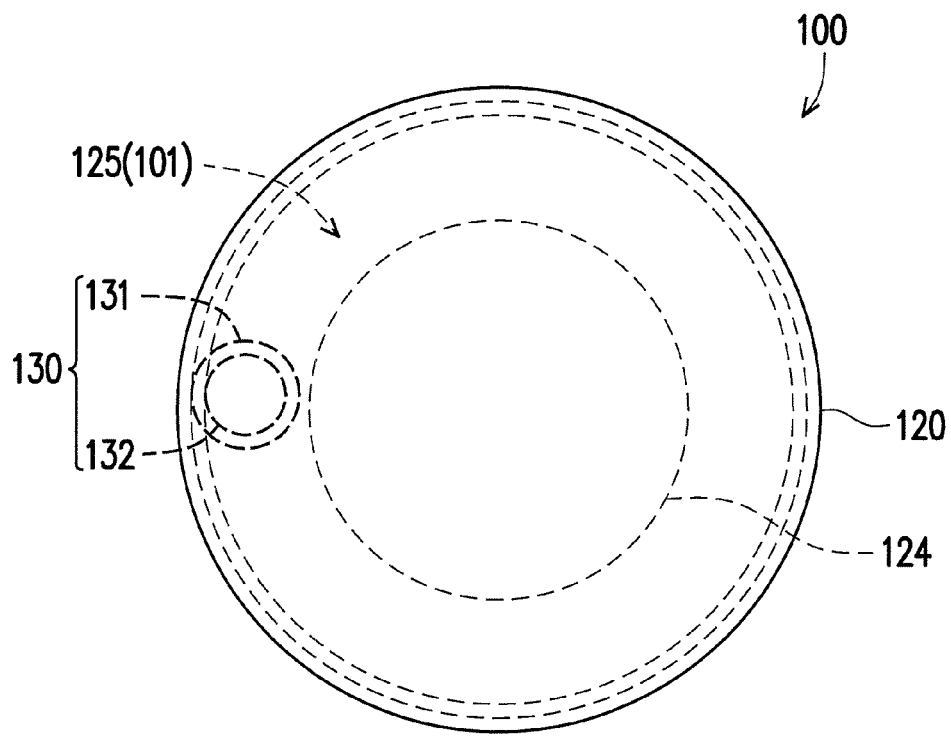
FIG. 1 is a schematic top view illustrating a wireless charging device according to a first embodiment of the invention.
Figure 2:
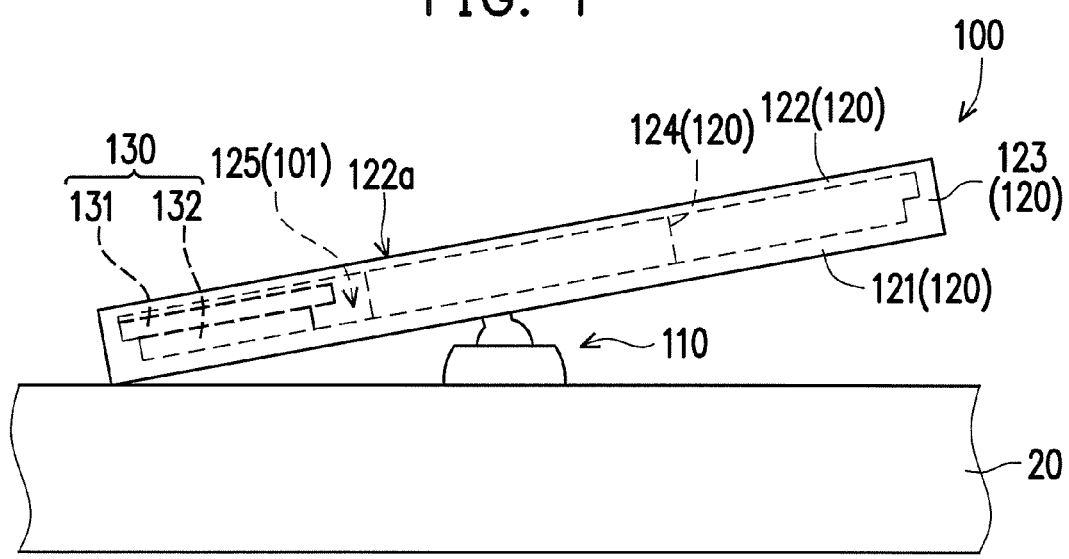
FIG. 2 is a schematic side view of the wireless charging device of FIG. 1.
Figure 3:
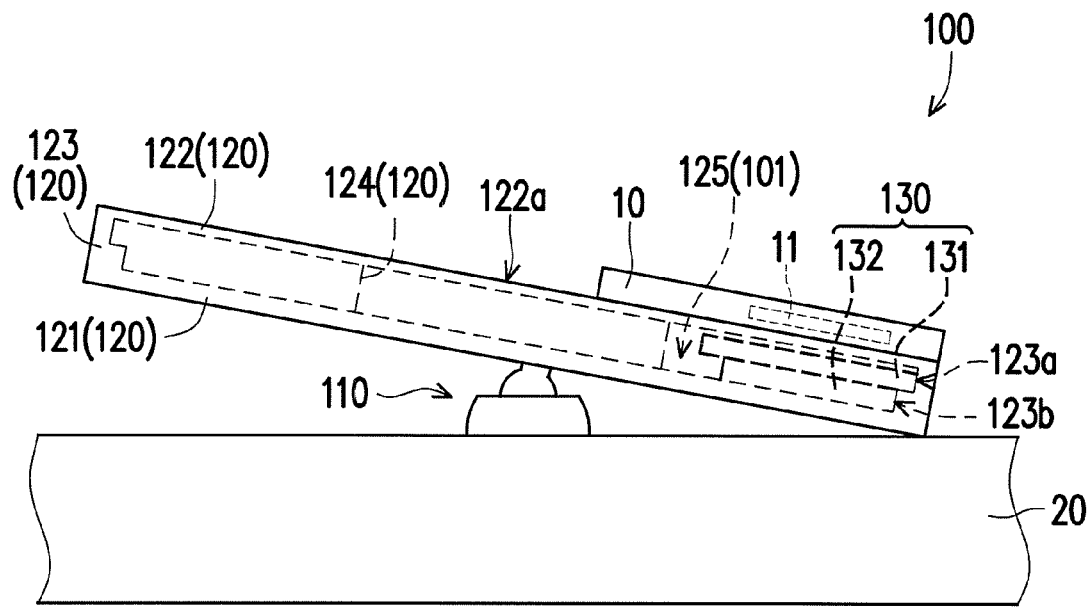
FIG. 3 is a schematic side view of the wireless charging device of FIG. 2 after an electronic device is placed thereon.

FIG. 1 is a schematic top view illustrating a wireless charging device according to a first embodiment of the invention. FIG. 2 is a schematic side view of the wireless charging device of FIG. 1. FIG. 3 is a schematic side view of the wireless charging device of FIG. 2 after an electronic device is placed thereon. Referring to FIG. 1 through FIG. 3, in the present embodiment, a wireless charging device 100 is capable of charging an electronic device 10. The electronic device 10 is, for example, a Smart Phone, a Table PC, a Notebook computer, or other type of electronic product having an electrical receiver 11 for receiving power disposed thereon. The electrical receiver 11 is, for example, a power receiving inductive coil or a power receiver, which is capable of performing wireless charging by means of inductive coupling or other methods.

The wireless charging device 100 may include a supporting component 110, a stage 120 and an electrical transmitter 130. The supporting component 110 is disposed between the stage 120 and the platform 20, and is connected on a centroid position of the stage 120. Specifically, the stage 120 may swingingly (or rotatably or oscillatingly) be disposed on the platform 20 through the supporting component 110. The supporting component 110 is, for example a ball-type shaft or an omnidirectional universal joint, which has three rotational degrees of freedom, and thereby increases a flexibility of the stage 120 when the stage 120 swings (or rotates or oscillates) relative to the platform 20.

As shown in FIG. 1 and FIG. 2, the stage 120 may have a main body portion 121, a carrying portion 122 and a sidewall portion 123. The main body portion 121 is connected to the supporting component 110. The carrying portion 122 may have a carrying surface 122a facing backwards to the supporting component 110 for carrying the electronic device 10. The carrying surface 122a is, for example, a smooth surface and has a lower surface friction coefficient, so the electronic device 10 can move smoothly on the carrying portion 122. On the other hand, the sidewall portion 123 surrounds about the main body portion 121 and is connected between the main body portion 121 and the carrying portion 122. That is to say, the sidewall portion 123 can separate the main body portion 121 from the carrying portion 122, so as to define an accommodating space 101 with the main body portion 121 and the carrying portion 122.

In the present embodiment, the electrical transmitter 130 is movably disposed in the stage 120. In further speaking, the electrical transmitter 130 is movably disposed in the accommodating space 101. For instance, a surface of the main body portion 121 exposed within the accommodating space 101 is a smooth surface and has a lower surface friction coefficient, so the electrical transmitter 130 can move smoothly on the main body portion 121. As shown in FIG. 2, when the electronic device 10 is not yet placed on the carrying portion 122, the stage 120 is, for example, abutted against the platform 20 with an end of the electrical transmitter 130. As shown in FIG. 3, when the electronic device 10 is placed on the carrying portion 122, whereby the electronic device 10 is, for example, being placed on an end of the stage 120 which is relatively away from the supporting component 110, the stage 120 swings in relative to the platform 20 by using the supporting component 110 as a fulcrum and is inclined to the platform 20, such that the stage 120 is abutted against the platform 20 with the end that the electronic device 10 is located on. At this moment, the electrical transmitter 130 moves toward the electronic device 10 due to gravitational pull, and thereby aligns with the electrical receiver 11 in the electronic device 10 so as to wirelessly charging the electronic device 10.

In brief, the electrical transmitter 130 in the wireless charging device 100 may automatically align with the electronic device 10 via the gravitational pull; and after the electrical transmitter 130 is aligned to the electrical receiver 11 in the electronic device 10, the electrical transmitter 130 and the electrical receiver 11 may perform wireless charging by means of inductive coupling, and thus an operational convenience of user and a wireless charging efficiency can be improved. The electrical receiver 11 and the electrical transmitter 130 should comply to the same wireless charging standard, such as Power Matters Alliance (PMA) Standard, Wireless Power Consortium standard (commonly known as Qi standard) and/or Alliance for Wireless Power Stand (commonly known as A4WP standard).

Referring to FIG. 3, in the present embodiment, the stage 120 is, for example, a power supplying stage, in which a sidewall portion 123 thereof has a positive electrode region 123a and a negative electrode region 123b. The negative electrode region 123b is, for example located between the positive electrode region 123a and the main body portion 121. On the other hand, the electrical transmitter 130 may have a positive electrode portion 131 disposed corresponding to the positive electrode region 123a and a negative electrode portion 132 disposed corresponding to the negative electrode region 123b. The electrical transmitter 130 is, for example, abutted against the main body portion 121 with the negative electrode portion 132. After the electrical transmitter 130 moves toward the electronic device 10 due to the gravitational pull, the positive electrode portion 131 is abutted against the sidewall portion 123 so as to electrically couple to the positive electrode region 123a. At the same time, the negative electrode region 123b is also abutted against the sidewall portion 123 so as to electrically couple to the negative electrode region 123b. Generally, the positive electrode portion 131 and the negative electrode portion 132 can respectively be disposed with power supplying inductive coils. The stage 120 may respectively energize the power supplying inductive coils of the positive electrode portion 131 and the negative electrode portion 132 through the positive electrode region 123a and the negative electrode region 123b, so as to generate an electromagnetic field. After the electrical receiver 11 senses the electromagnetic field, it can transfer the electromagnetic power of the electromagnetic field into electric power, so as to charge a power storage unit (e.g., a rechargeable battery) of the electronic device 10.

For instance, the positive electrode region 123a and the negative electrode region 123b of the sidewall portion 123 are, for example, electrically connected with an external power source, respectively, so as to obtain the power required for energizing the power supplying inductive coils of the positive electrode portion 131 and the negative electrode portion 132, respectively. In other embodiment, circuits of the power source can be directly connected to the power supplying inductive coils of the positive electrode portion and the negative electrode portion of the electrical transmitter, so as to directly supply power to the power supplying inductive coils of the positive electrode portion and the negative electrode portion.

Referring to FIG. 1, in the present embodiment, the stage 120 appears to have a discoid shape, and the sidewall portion 123 thereof, for example, appears to have a ring shape. On the other hand, the stage 120 further has an extending portion 124. The extending portion 124 protrudes out of the main body portion 121 and is located in the accommodating space 101. In detail, the extending portion 124 is, for example, an island structure with a circular shape or an elliptical shape, and maintains a space with the sidewall portion 123 so as to define an annular guide groove 125 with the sidewall portion 123. The electrical transmitter 130 is movably disposed in the guide groove 125, so as to move towards the electronic device 10 along the guide groove 125 when being subjected to the gravitational pull. In other embodiment (not shown), the extending portion may be an annular structure that maintains a space with the sidewall portion, so as to define an annular guide groove with the sidewall portion.

Several other embodiments are described below as examples of the invention. It is to be noted that, the following embodiments have adopted component notations and part of the contents from the previous embodiment, wherein the same notations are used for representing the same or similar components, and descriptions of the same technical contents are omitted. The descriptions regarding the omitted part may be referred to the previous embodiment, and thus are not repeated herein.

Figure 4:
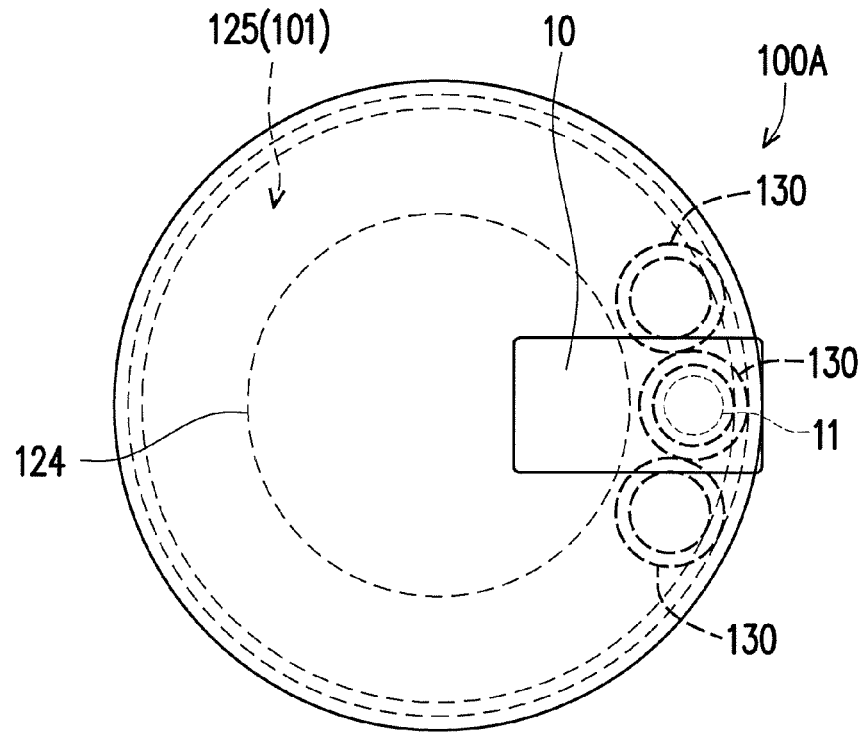
FIG. 4 is a schematic top view illustrating a wireless charging device according to a second embodiment of the invention.

FIG. 4 is a schematic top view illustrating a wireless charging device according to a second embodiment of the invention. Referring to FIG. 4, a difference between the wireless charging device 100A of the present embodiment and the wireless charging device 100 of the first embodiment lies in that: the number of the electrical transmitter 130 of the wireless charging device 100A is a plurality, and the electrical transmitters 130 are movably disposed in a same guide groove 125. For instance, after each of the electrical transmitters 130 moves to the electronic device 10 along the guide groove 125 due to gravitational pull, one of the electrical transmitters 130 would be aligned with the electrical receiver 11 in the electronic device 10, so as to wirelessly charge the electronic device 10. In other embodiment, a plurality of electronic devices can simultaneously be placed on the stage, so that after each of the electrical transmitters moves toward the electronic devices along the corresponding guide groove due to the gravitational pull, the electrical transmitters can align with the electrical receivers in the electronic devices, respectively, so as to wirelessly charge the electronic devices, respectively.

Figure 5:
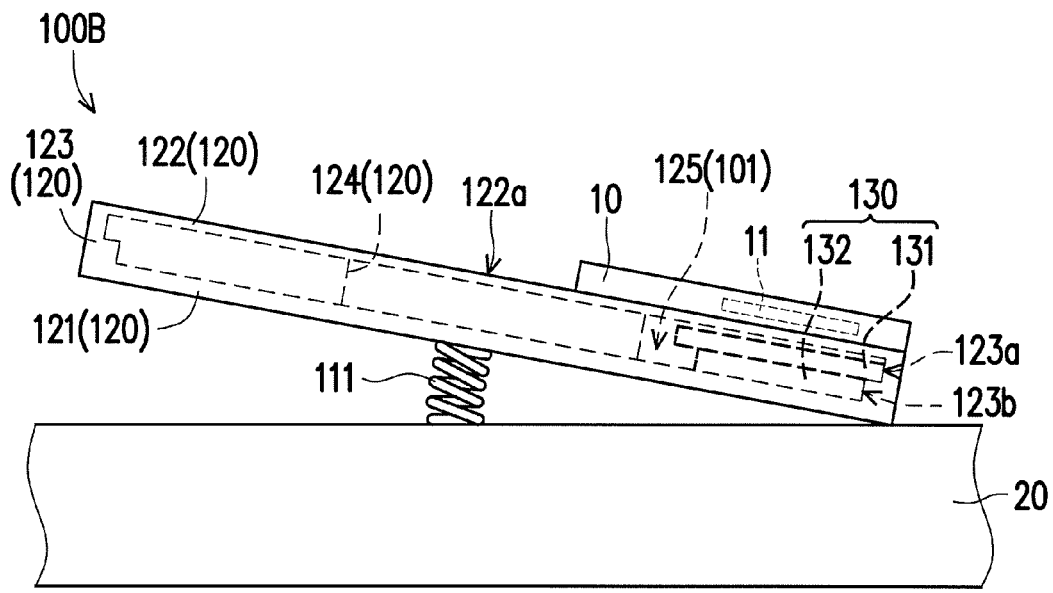
FIG. 5 is a schematic side view illustrating a wireless charging device according to a third embodiment of the invention.

FIG. 5 is a schematic side view illustrating a wireless charging device according to a third embodiment of the invention. Referring to FIG. 5, a difference between the wireless charging device 100B of the present embodiment and the wireless charging device 100 lies in that: the supporting component 111 of the wireless charging device 100A is, for example, a spring. For instance, the spring can have a higher elastic coefficient, also known as having a lower damping coefficient. Therefore, when the electronic device 10 is placed on the carrying portion 122, whereby the electronic device 10 is, for example, being placed on an end of the stage 120 which is relatively away from the supporting component 111, the stage 120 swings in relative to the platform 20 by using the supporting component 111 as a fulcrum and is inclined to the platform 20, such that the stage 120 is abutted against the platform 20 with the end that the electronic device 10 is located on. At this moment, the supporting component 111 bends and deforms toward the end that the electronic device 10 is located on in a manner of elastic deformation.

Figure 6:
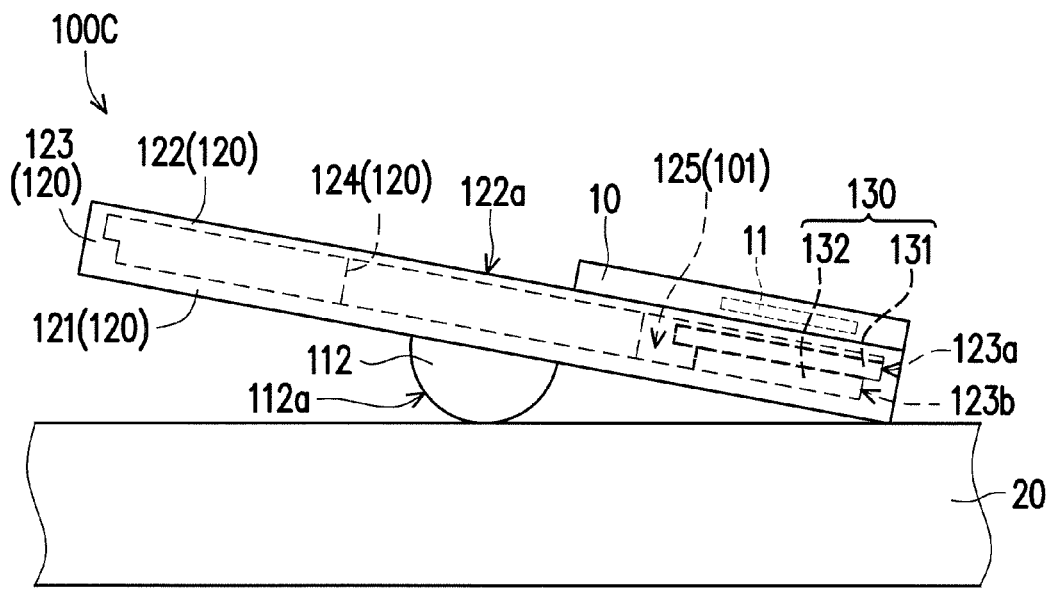
FIG. 6 is a schematic side view illustrating a wireless charging device according to a fourth embodiment of the invention.

FIG. 6 is a schematic side view illustrating a wireless charging device according to a fourth embodiment of the invention. Referring to FIG. 6, a difference between the wireless charging device 100C of the present embodiment and the wireless charging device 100 of the first embodiment lies in that: the supporting component 112 of the wireless charging device 100C may have a curvy surface portion 112a, and the supporting component 112 is, for example, abutted against the platform 20 with the curvy surface portion 112a thereof. Therefore, when the electronic device 10 is placed on the carrying portion 122, whereby the electronic device 10 is, for example, being placed on an end of the stage 120 which is relatively away from the supporting component 112, the stage 120 swings in relative to the platform 20 through the curvy surface portion 112a by using the supporting component 112 as a fulcrum and is inclined to the platform 20, such that the stage 120 is abutted against the platform 20 with the end that the electronic device 10 is located on.

Figure 7:
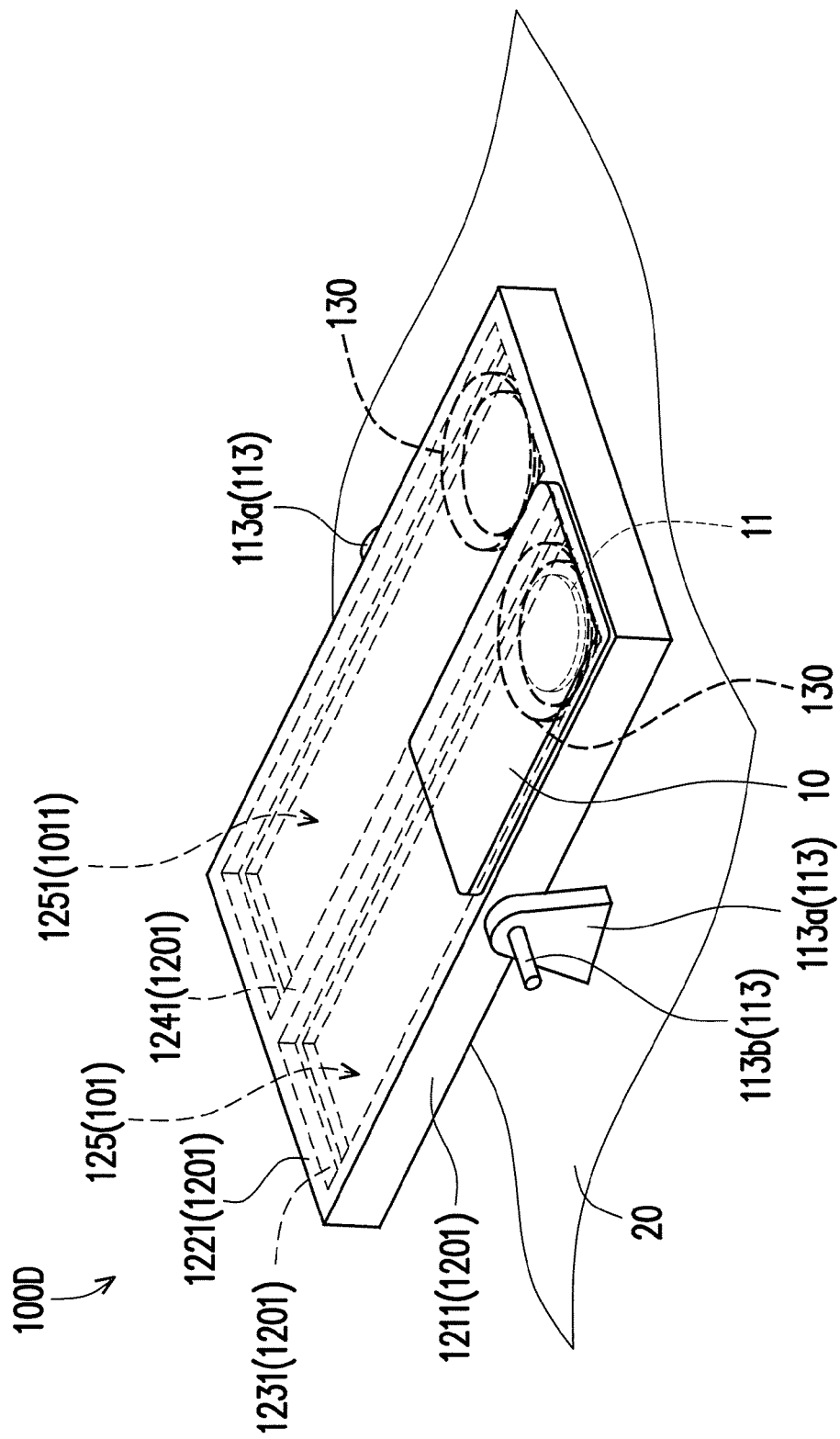
FIG. 7 is a perspective view illustrating a wireless charging device according to a fifth embodiment of the invention.

FIG. 7 is a perspective view illustrating a wireless charging device according to a fifth embodiment of the invention. Referring to FIG. 7, a difference between the wireless charging device 100D and the wireless charging device 100 of the first embodiment lies in that: the stage 1201 of the wireless charging device 100D is substantially a rectangular body, wherein the extending portion 1241 is, for example, a strip-shaped structure and connected with the sidewall portion 1231 to define two guide grooves 1251, each having substantially a rectangular shape, with the sidewall portion 1231. For instance, the extending portion 1241 divides the accommodating space 1011 into two. On the other hand, the number of the electrical transmitters 130 is corresponded to the number of the guide grooves 1251, and the electrical transmitters 130 are movably disposed in the guide grooves 1251, respectively. In other embodiment (not shown), the number of the extending portions can be more than two, and the extending portions can be arranged side-by-side in the accommodating space to define more than three guide groves, each having substantially a rectangular shape, with the sidewall portion.

In the present embodiment, the supporting component 113 includes at least one carrying base 113a (two are illustrated in FIG. 7) and an axle shaft 113b pivoted on the carrying bases 113a. The stage 1201 is located between the carrying bases 113a, and the axle shaft 113b penetrates through the main body portion 1211 of the stage 1201. Therefore, when the electronic device 10 is placed on the carrying portion 1221, whereby the electronic device 10 is, for example, being placed on an end of the stage 1201 which is relatively away from the supporting component 113, the stage 1201 can swing in relative to the carrying base 113a through the axle shaft 113b and thereby incline to the platform 20, so to abut against platform 20 with the end that the electronic device 10 is placed on. After each of the electrical transmitters 130 moves toward the electronic device 10 along the corresponding guide groove 1251 due to the gravitational pull, one of the electrical transmitters 130 would be aligned with the electrical receiver 11 in the electronic device 10, so as to wirelessly charge the electronic device 10. In other embodiment, a plurality of electronic devices can simultaneously be placed on the stage, so that after each of the electrical transmitters moves toward the electronic devices along the corresponding guide groove due to the gravitational pull, the electrical transmitters can align with the electrical receivers in the electronic devices, respective, so as to wirelessly charge the electronic devices, respectively.

In summary, the wireless charging device of the invention can be used to carry the electronic device to be charged, wherein after the electronic device to be charged is placed on the wireless charging device, the electrical transmitter in the wireless charging device moves toward the electronic device to be charged due to the gravitational pull because of the inclination of the wireless charging device. After the electrical transmitter automatically aligns with the electronic device to be charged, such as aligning with the electrical receiver in the electronic device to be charged, the electrical transmitter and the electrical receiver can perform the wireless charging by means of inductive coupling, and thus an operational convenience of user and a wireless charging efficiency can be improved. On the other hand, the structural design of the wireless charging device can be simplified with the use of gravitational pull, and the embodiments of the invention also do not require using other electronic equipment for detecting the position of the electronic device to be charged, and thus the costs are lowered.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wireless charging device capable of charging at least one electronic device, the wireless charging device comprising:
   a supporting component;
   a stage, configured to carry the electronic device and swingingly disposed on a platform through the supporting component; and
   at least one electrical transmitter, movably disposed in the stage, wherein when the at least one electronic device is placed on an end of the stage which is relatively away from the supporting component, the stage swings in relative to the platform by using the supporting component as a fulcrum and is inclined to the platform, so the at least one electrical transmitter moves toward the at least one electronic device due to gravitational pull, and thereby automatically aligns with an electrical receiver in the at least one electronic device so as to wirelessly charge the at least one electronic device.

2. The wireless charging device as recited in claim 1, wherein the stage has a main body portion, a carrying portion and a sidewall portion, the main body portion is connected to the supporting component, the carrying portion is configured to carry the electronic device, the sidewall portion surrounds about the main body portion and is connected between the main body portion and the carrying portion, so as to define an accommodating space with the main body portion and the carrying portion, and the at least one electrical transmitter is movably disposed in the accommodating space.

3. The wireless charging device as recited in claim 2, wherein the stage further has at least one extending portion, the at least one extending portion protrudes out of the main body portion and is located in the accommodating space, so as to define at least one guide groove with the sidewall portion, and the at least one electrical transmitter is movably disposed in the at least one guide groove.

4. The wireless charging device as recited in claim 3, wherein when the number of the at least one guide groove is a plurality, the number of the at least one electrical transmitter is corresponded to the number of the guide grooves, and the electrical transmitters are movably disposed in the guide grooves, respectively.

5. The wireless charging device as recited in claim 4, wherein after each of the electrical transmitters moves toward the at least one electronic device along the corresponding guide groove due to the gravitational pull, one of the electrical transmitters is aligned with the electrical receiver in the at least one electronic device.

6. The wireless charging device as recited in claim 3, wherein when the number of the at least one electrical transmitter is a plurality, the electrical transmitters are movably disposed in the at least one guide groove.

7. The wireless charging device as recited in claim 6, wherein after each of the electrical transmitters moves toward the at least one electronic device along the at least one guide groove due to the gravitational pull, one of the electrical transmitters is aligned to the electrical receiver in the at least one electronic device.

8. The wireless charging device as recited in claim 3, wherein the sidewall portion and the at least one extending portion maintains a space therebetween.

9. The wireless charging device as recited in claim 3, wherein the sidewall portion and the at least one extending portion are connected with each other.

10. The wireless charging device as recited in claim 2, wherein the sidewall portion has a positive electrode region and a negative electrode region, the at least one electrical transmitter has a positive electrode portion and a negative electrode portion, after the at least one electrical transmitter moves towards the at least one electronic device due to the gravitational pull, the positive electrode portion is electrically coupled to the positive electrode region, and the negative electrode portion is electrically coupled to the negative electrode region.

11. The wireless charging device as recited in claim 1, wherein the supporting component is connected on a centroid position of the stage.

12. The wireless charging device as recited in claim 1, wherein the supporting component comprises a ball-type shaft, a universal joint or a spring.

13. The wireless charging device as recited in claim 1, wherein the supporting component comprises at least one carrying base and an axle shaft pivoted on the at least one carrying base, and the axle shaft penetrates through the stage.

14. The wireless charging device as recited in claim 1, wherein the supporting component has a curvy surface portion and is abutted against the platform with the curvy surface portion.

* * * * *